United States Patent
Yang (10) Patent No.: US 7,286,376 B2
(45) Date of Patent: Oct. 23, 2007

(54) SOFT-SWITCHING POWER CONVERTER HAVING POWER SAVING CIRCUIT FOR LIGHT LOAD OPERATIONS

(75) Inventor: Ta-yung Yang, Milpitas, CA (US)

(73) Assignee: System General Corp., Taipei Hsien (TW)

( * ) Notice: Subject to any disclaimer, the term of this patent is extended or adjusted under 35 U.S.C. 154(b) by 0 days.

(21) Appl. No.: 11/285,964

(22) Filed: Nov. 23, 2005

(65) Prior Publication Data

US 2007/0115699 A1 May 24, 2007

(51) Int. Cl.
H02M 3/335 (2006.01)
H02M 3/22 (2006.01)

(52) U.S. Cl. .................... 363/97; 363/21.15; 363/21.18

(58) Field of Classification Search ............... 363/16, 363/20, 21.01, 21.02, 21.03, 21.04, 21.07, 363/21.1, 21.11, 21.12, 21.15, 21.18, 97
See application file for complete search history.

(56) References Cited

U.S. PATENT DOCUMENTS

| | | | |
|---|---|---|---|
| 4,855,888 A | 8/1989 | Henze et al. ............. | 363/17 |
| 5,442,542 A | 8/1995 | Cook .......................... | 700/12 |
| 5,973,939 A | 10/1999 | Tan ........................ | 363/21.06 |
| 6,069,798 A | 5/2000 | Liu .............................. | 363/16 |
| 6,191,960 B1 | 2/2001 | Fraidlin et al. .............. | 363/25 |
| 6,631,082 B2 * | 10/2003 | Birumachi .................. | 363/97 |

* cited by examiner

*Primary Examiner*—Gary L Laxton
(74) *Attorney, Agent, or Firm*—J.C. Patents (57) ABSTRACT

A soft switching power converter includes a first switch for switching a transformer to transfer energy. A second switch is equipped to switch energy in a capacitor to the transformer to achieve soft switching for the next switching cycle. A control circuit is coupled to an output of the power converter for generating a first signal and a second signal in response to a feedback signal for regulating the output of the power converter. A first delay time is generated after the first switch is turned off and before the second signal is on. A second delay time is generated after the second switch is turned off and before the first signal is on. The second delay time is increased corresponding to a decrement of the feedback signal under light load conditions.

10 Claims, 9 Drawing Sheets

SOFT-SWITCHING POWER CONVERTER HAVING POWER SAVING CIRCUIT FOR LIGHT LOAD OPERATIONS

BACKGROUND OF THE INVENTION

1. Field of the Invention

The present invention relates to power converters, and more particularly to the control circuit of power converters.

2. Description of the Related Art

Power converters are used for converting an unregulated power source to a constant voltage source. Power converters generally include a transformer having a primary winding and a secondary winding for providing the isolation. The switching devices are connected to the primary winding for controlling the energy transfer from the primary winding to the secondary winding. A higher operating frequency allows a reduced size and weight for power converters. However, the switching losses, the component stresses, and electromagnetic interference (EMI) are the inherent problems. In recent developments, a popular phase-shift scheme for soft switching has been proposed for high frequency power conversion for reducing switching losses. Among them, the full-bridge (FB) quasi-resonant ZVS technique is described in the following: "Constant frequency resonant power converter with zero voltage switching" by Christopher, P. Henze, Ned Mohan, and John G. Hayes, U.S. Pat. No. 4,855,888, Aug. 8, 1989; "Soft-switching PWM converters" by Guichao C. Hua and Fred C. Lee, U.S. Pat. No. 5,442,540, Aug, 15, 1995; "Soft-switched full-bridge converters" by Yungtaek Jang and Milan M. Jovanovic, Mar. 12, 2002. The active clamp techniques are disclosed for the forward ZVS power converters such as: "Double forward converter with soft-PWM switching" by F. Don Tan, U.S. Pat. No. 5,973,939, Oct. 26, 1999; "Active clamp isolated power converter and method of operating thereof" by Simon Fraidlin and Anatoly Polikarpov, U.S. Pat. No. 6,191,960, Feb. 20, 2001. As for the half-bridge (HB) topology, an asymmetrical scheme is developed for ZVS, "Asymmetrical power converter and method of operation thereof" by Rui Liu, U.S. Pat. No. 6,069,798, May 30, 2000. In the various ZVS converters, the parasitic leakage inductance of the transformer or the additional magnetic components are employed as a resonant inductor or switches for generating the circulating current for achieving the zero voltage transition and switching.

Figure 1:
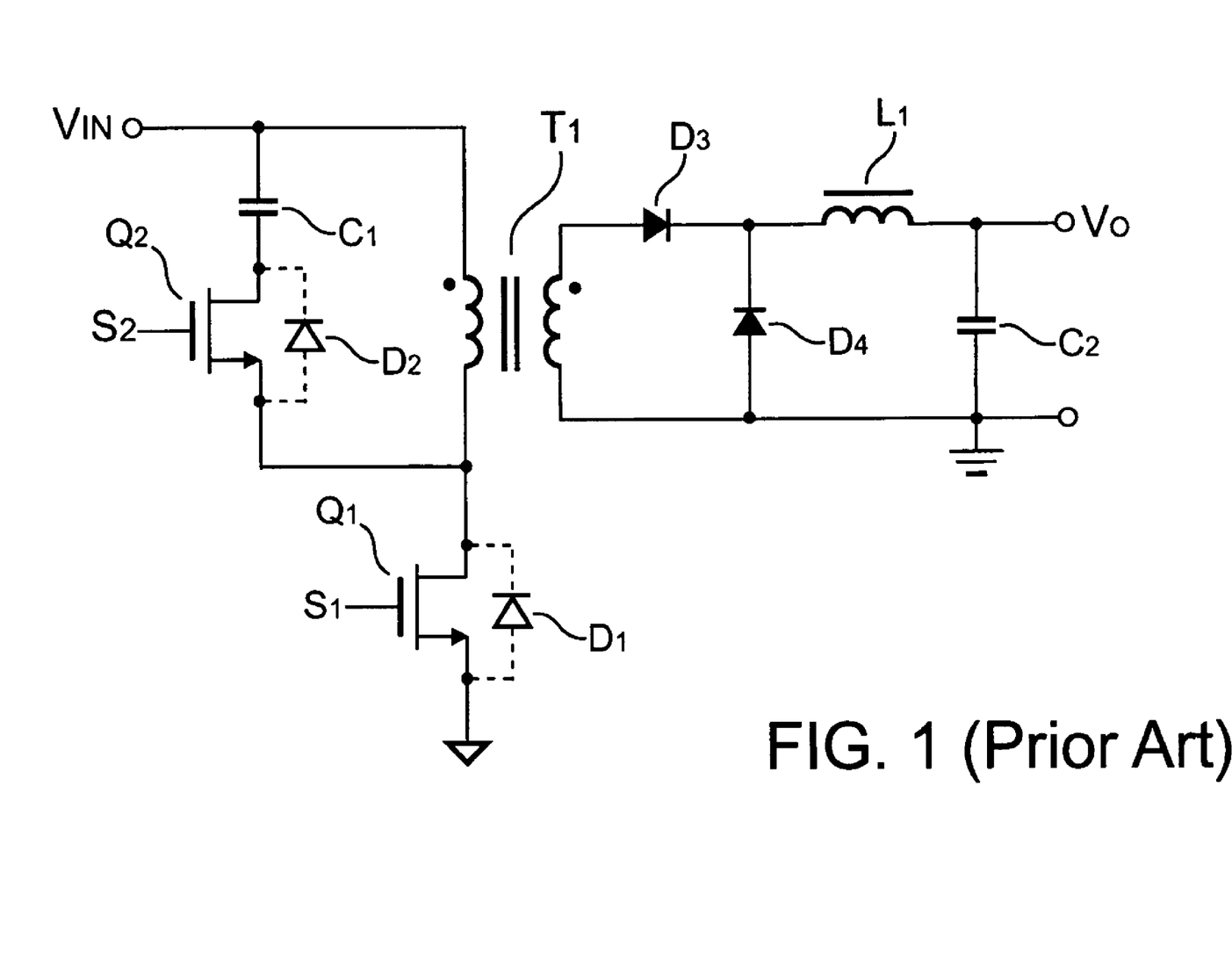
FIG. 1 is a schematic circuit of a traditional active clamp power converter.
Figure 1A:
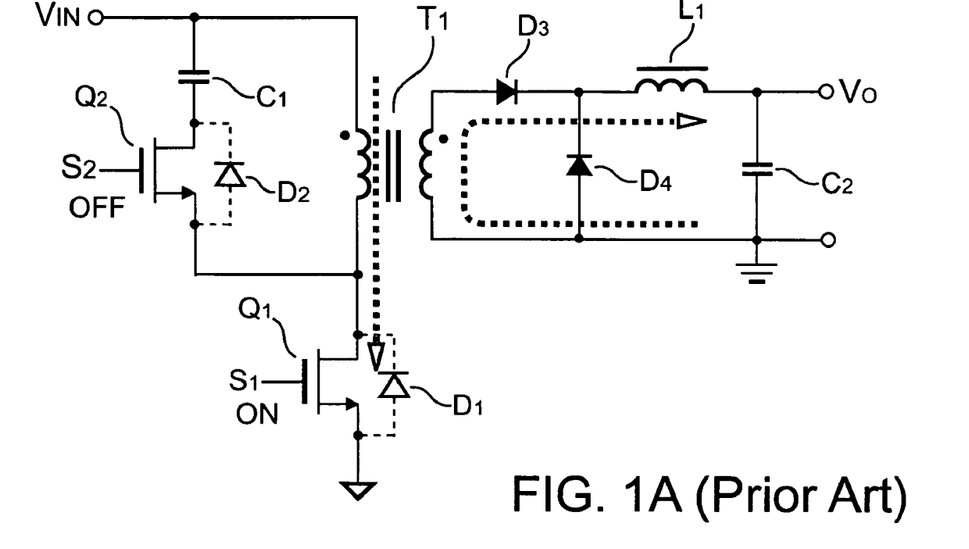
FIG. 1A~FIG. 1D illustrate four operational stages of the power converter shown in FIG. 1.
Figure 1B:
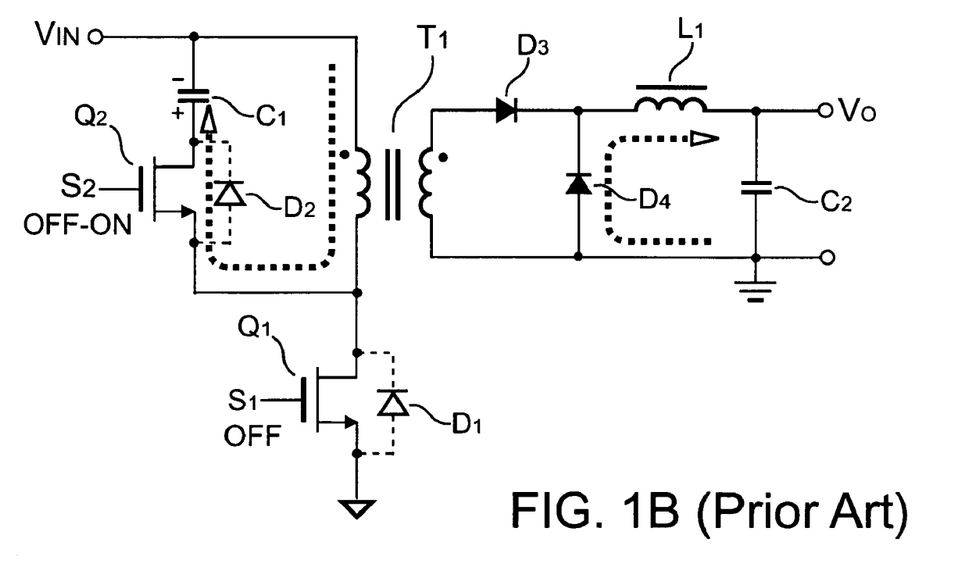
Figure 1C:
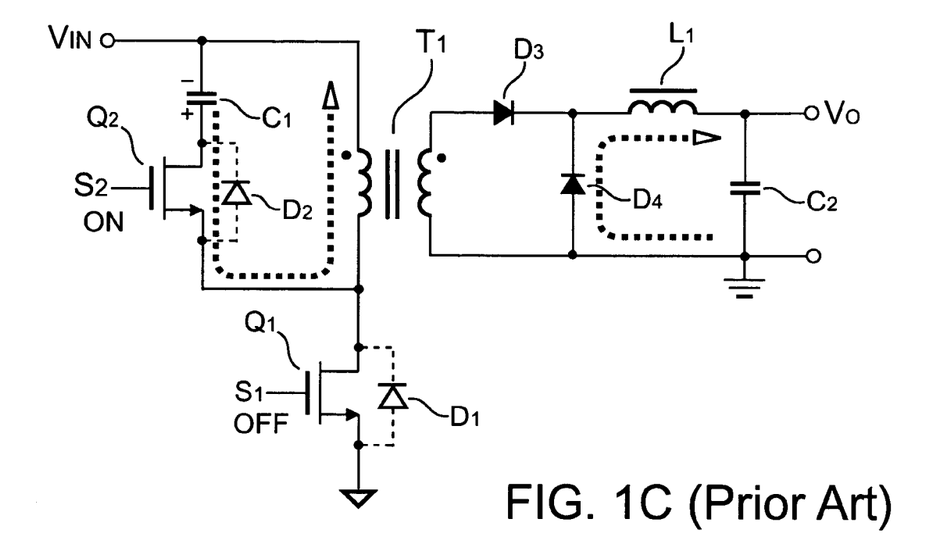
Figure 1D:
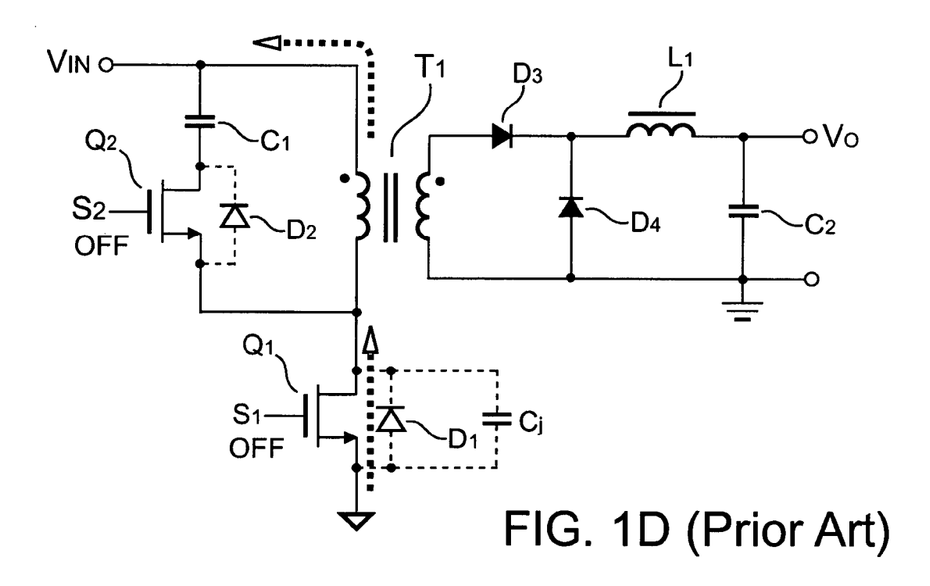

FIG. 1 illustrates a traditional active clamp power converter. FIG. 1A~FIG. 1D illustrate four operational stages of the aforementioned power converter. As FIG. 1A illustrates, a first signal $S_1$ switches on a transistor $Q_1$ to transfer the energy from an input of the power converter to an output of the power converter via a transformer $T_1$. When the transistor $Q_1$ is switched off as illustrated in FIG. 1B, the magnetic energy of the transformer $T_1$ shall flow into the capacitor $C_1$ via a parasitic diode $D_2$. Meanwhile, a second signal $S_2$ shall turn on a transistor $Q_2$ for achieving the soft switching operation of the transistor $Q_2$. After the magnetic energy of the transformer $T_1$ is fully discharged, the capacitor $C_1$ shall start to charge the transformer $T_1$ via the transistor $Q_2$, as illustrated in FIG. 1C. FIG. 1D illustrates the fourth operation stage, in which the second signal $S_2$ turns off the transistor $Q_2$ to cut off the current flowing between the transformer $T_1$ and the capacitor $C_1$. Meanwhile, the energy stored in the transformer $T_1$ shall produce a circulating current to discharge the parasitic capacitor $C_j$ of the transistor $Q_1$. To turn on a parasitic diode $D_1$ for achieving soft switching operation of the transistor $Q_1$, the parasitic capacitor $C_j$ must be fully discharged in advance.

The criterion for achieving the transition is given by:

$$I_p^2/(2 \times L_p) > C_j \times V_{IN}^2/2$$

where Lp is the primary-winding inductance of the transformer $T_1$, Ip is the primary-winding current of the transformer, and $V_{IN}$ is the input voltage of the power converter.

Since the resonant frequency $f_r$ is given by:

$$f_r = 1/(2\pi \times L_p \times C_j)$$

A delay time $T_{D1}$ for achieving the phase shift for soft switching operation is given by:

$$T_{D1} = 1/(4 \times f_r)$$
$$= \pi \times L_p \times C_j/2$$

Figure 2:
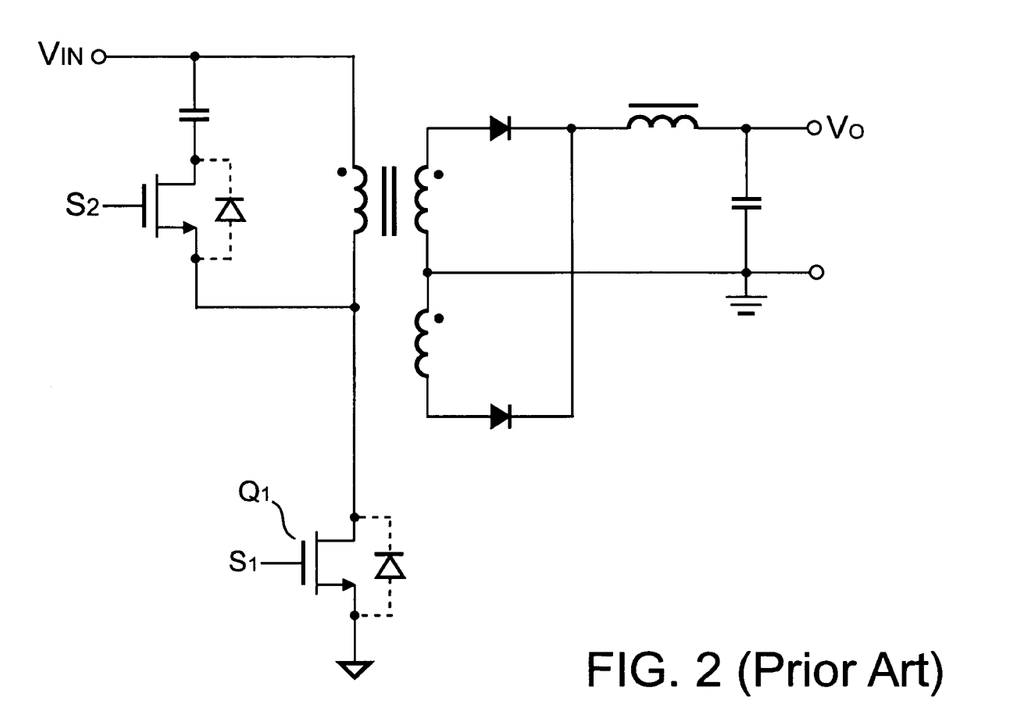
FIG. 2 is a circuit schematic illustrating a traditional asymmetrical half bridge forward power converter.

FIG. 2 illustrates a traditional asymmetrical half bridge forward power converter, in which the operation of the signals $S_1$ and $S_2$ is the same as the power converter shown in FIG. 1. Although the aforementioned power converters are able to achieve soft switching operation to reduce the switching loss under heavy load conditions, the drawback, however, is higher power consumption under light load conditions.

SUMMARY OF THE INVENTION

The objective of the invention is to provide a soft switching power converter to reduce power consumption under light load conditions.

The soft switching power converter includes a capacitor and a transformer. The capacitor is coupled to the transformer for soft switching operation. A first switch is applied to for switching the transformer to transfer energy from an input of the power converter to an output of the power converter. A second switch is utilized to switch energy of the capacitor to the transformer for generating a circulating current to achieve soft switching operation of the first switch. A control circuit is coupled to the output of the power converter for receiving a feedback signal. In accordance with the feedback signal, the control circuit generates a first signal and a second signal for regulating the output of the power converter. The first signal and the second signal are coupled to switch the first switch and the second switch, respectively. A first range of the feedback signal represents a heavy load condition, in which an on-time of the second signal increases in response to a decrement of an on-time of the first signal. On-time is defined as a period that a signal is turned on. A first delay time is generated after the first switch is turned off and before the second signal is on. A second delay time is generated after the second switch is turned off and before the first signal is on. The second delay time is constant with respect to the first range of the feedback signal. The second delay time is varied with respect to a second range of the feedback signal, in which the second delay time is increased proportionally to the feedback signal. The second range of the feedback signal represents a light load condition. The control circuit includes a threshold for defining the first range or the second range of the feedback signal. Furthermore, the control circuit includes an input terminal and a programming terminal. The input terminal is utilized to program the second delay time for the first range of the feedback signal. The programming terminal is developed for programming the threshold.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 3:
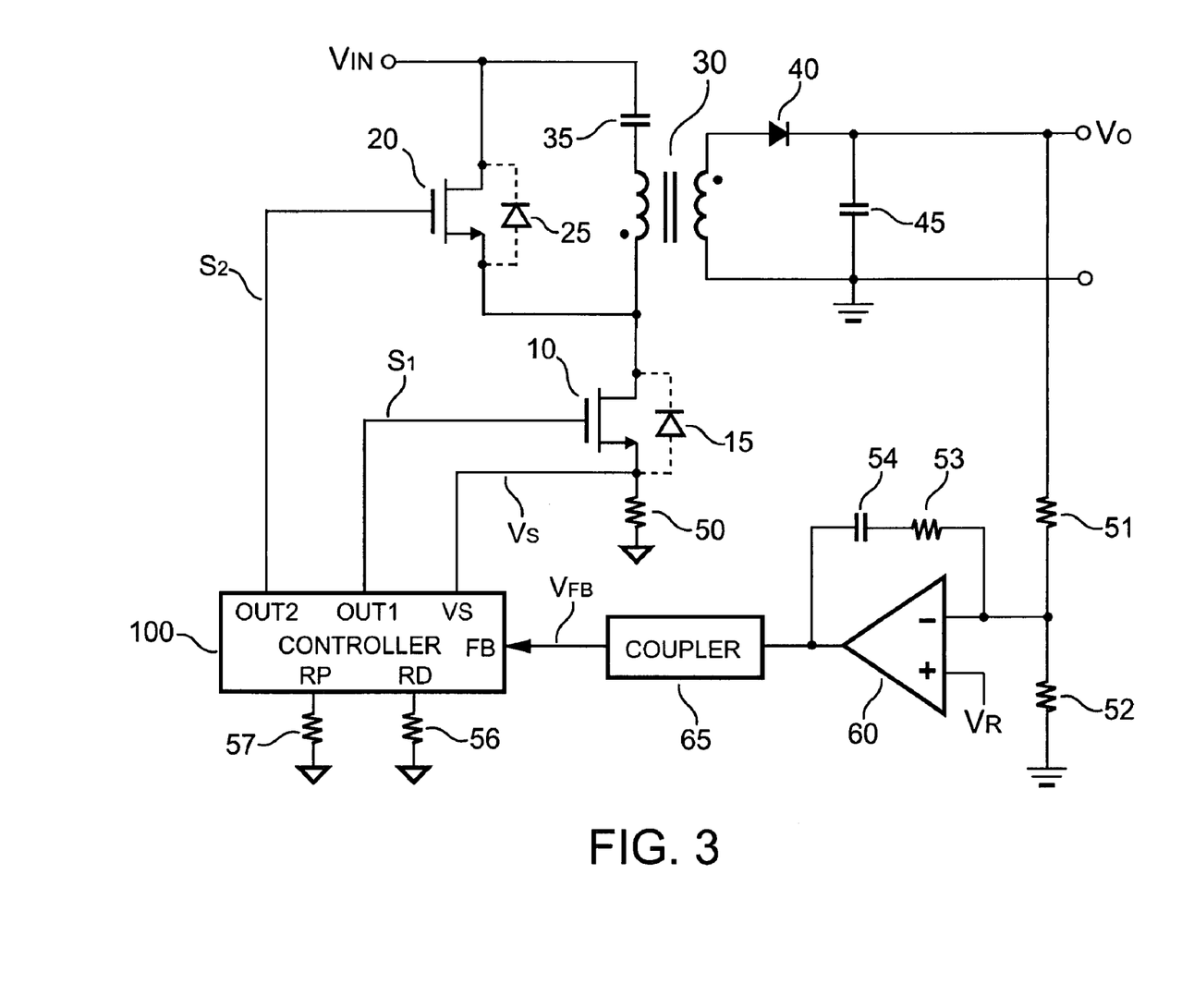
FIG. 3 is a schematic circuit of a soft switching power converter according to an embodiment of the present invention.

FIG. 3 is a schematic circuit of a soft switching power converter according to an embodiment of the present invention. It includes a magnetic device, such as a transformer 30. The transformer 30 is connected with a capacitor 35 in series. The capacitor 35 is used for soft switching operation. A first switch 10 is utilized for switching the transformer 30 to transfer the energy from an input of the power converter to an output of the power converter. A second switch 20 is coupled for switching the capacitor 35 to transfer the energy of the capacitor 35 to the transformer 30. A control circuit 100 is coupled to the output of the power converter to generate a first signal $S_1$ and a second signal $S_2$ in response to a feedback signal $V_{FB}$ for regulating the output of the power converter. The first signal $S_1$ and the second signal $S_2$ are coupled to switch the first switch 10 and the second switch 20, respectively. An error amplifier 60 having a reference signal $V_R$ is connected to the output of the power converter via a voltage divider formed by resistors 51 and 52. A resistor 53 and a capacitor 54 establish a frequency compensation network for the error amplifier 60. An output of the error amplifier 60 is connected to a coupler 65, such as an optical-coupler. An output of the coupler 65 further generates the feedback signal $V_{FB}$ to a feedback terminal FB of the control circuit 100. The control circuit 100 further includes a threshold to define whether the feedback signal $V_{FB}$ is in a first range or in a second range. The first range of the feedback signal $V_{FB}$ represents heavy load conditions. The second range of the feedback signal $V_{FB}$ represents light load conditions. The first signal $S_1$ and the second signal $S_2$ are generated corresponding to the feedback signal $V_{FB}$. An on-time of the second signal $S_2$ increases in response to a decrement of the on-time of the first signal $S_1$ in a first range of the feedback signal $V_{FB}$.

Figure 4A:
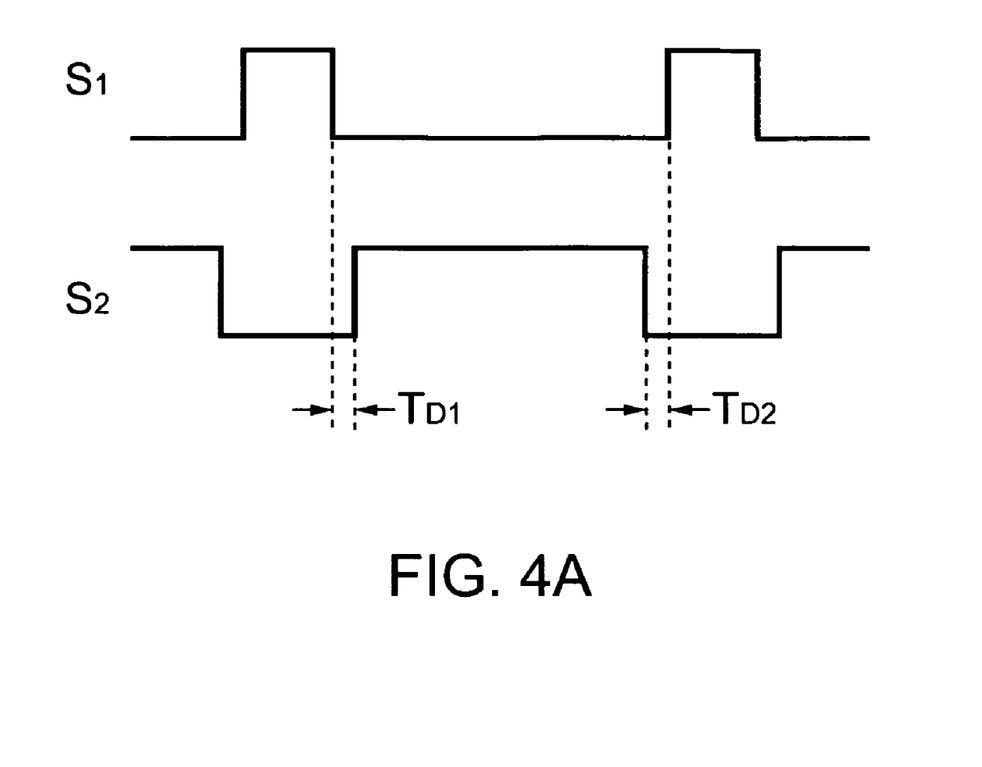
FIG. 4A and FIG. 4B illustrate a plurality of signal waveforms according to an embodiment of the present invention.
Figure 4B:
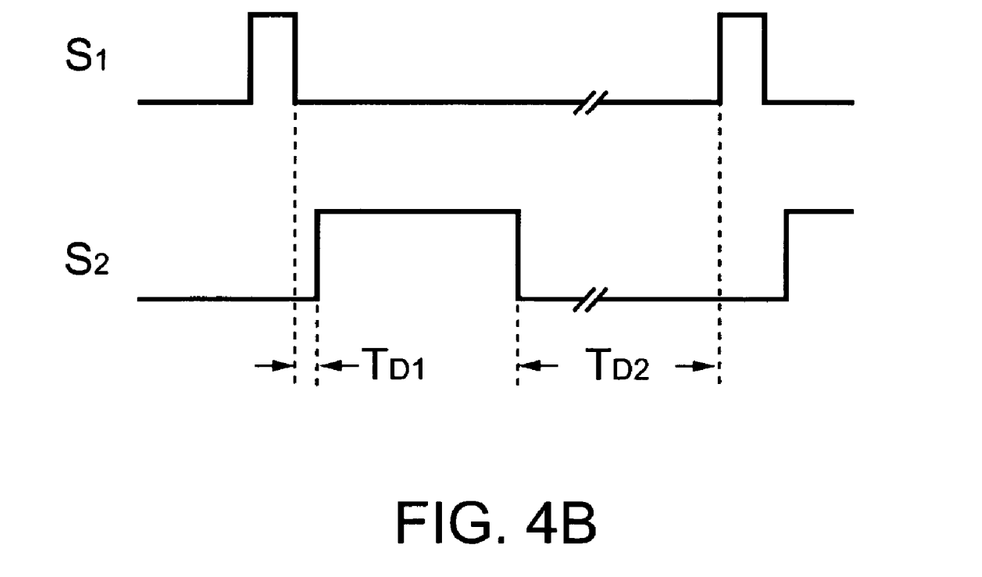

FIG. 4A and FIG. 4B illustrate waveforms of the power converter shown in FIG. 3. FIG. 4A illustrates the waveform of the first signal and the second signal under heavy load conditions. FIG. 4B illustrates the waveform of the first signal and the second signal under light load conditions. A first delay time $T_{D1}$ is generated after the first switch 10 is turned off and before the second signal $S_2$ is turned on. A second delay time $T_{D2}$ is generated after the second switch 20 is turned off and before the first signal $S_1$ is turned on. The second delay time $T_{D2}$ is constant with respect to the first range of the feedback signal $V_{FB}$. The second delay time $T_{D2}$ varies with respect to the second range of the feedback signal $V_{FB}$, in which the second delay time $T_{D2}$ increases in proportion to a decrement of the feedback signal $V_{FB}$.

The control circuit 100 as illustrated in FIG. 3 further includes an input terminal RD for programming the second delay time $T_{D2}$ in the first range of the feedback signal $V_{FB}$. A resistor 56 is connected from the input terminal RD of the control circuit 100 to a ground reference to program the second delay time $T_{D2}$. Furthermore, a resistor 57 is coupled from a programming terminal RP of the control circuit 100 to the ground reference for programming the threshold. A current-sense terminal VS of the control circuit 100 is connected to a resistor 50 to detect a switching current signal $V_S$ of the transformer 30 for achieving the PWM (pulse width modulation) control of the control circuit 100.

Figure 5:
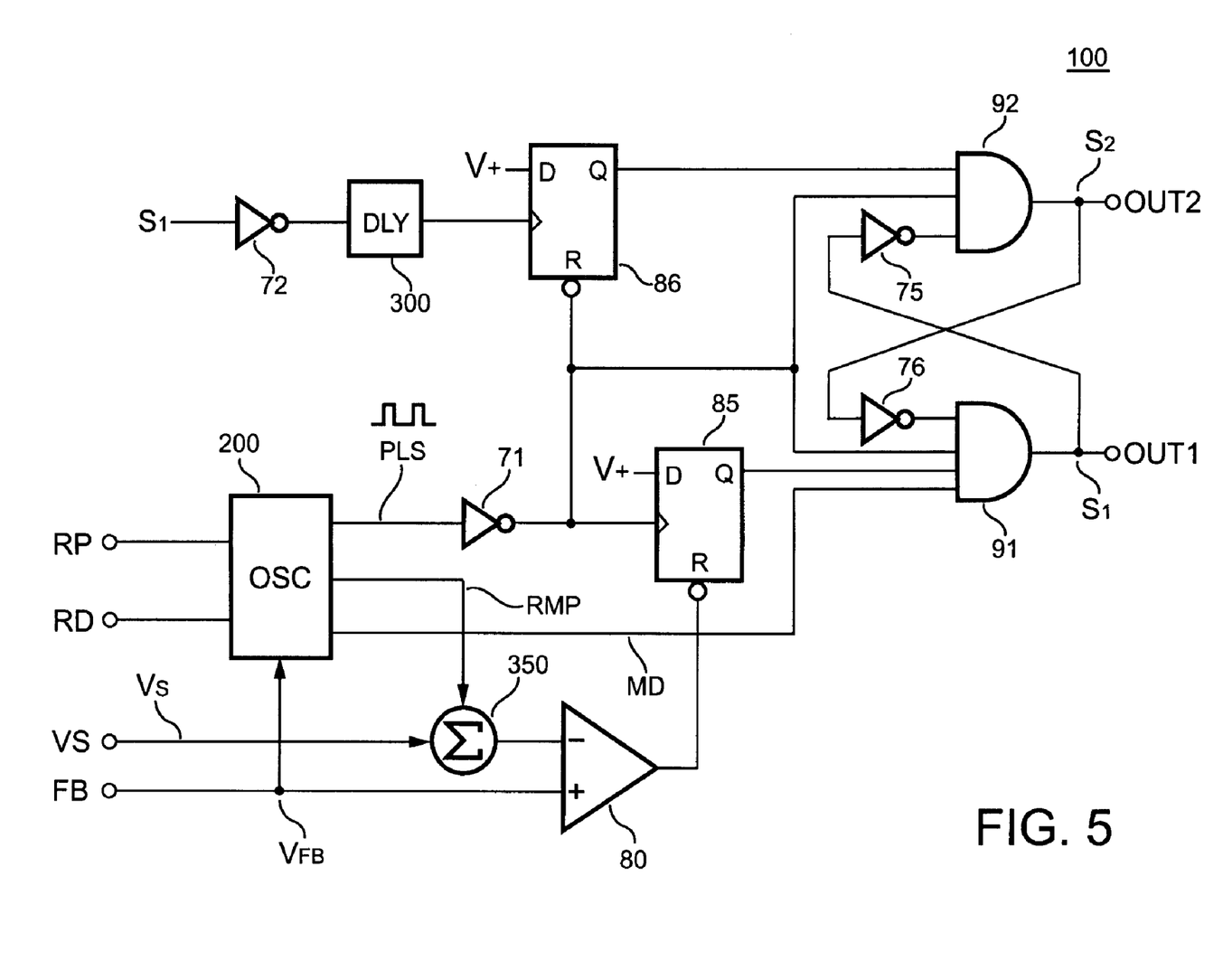
FIG. 5 is a schematic circuit of a control circuit according to an embodiment of the present invention.
Figure 7:
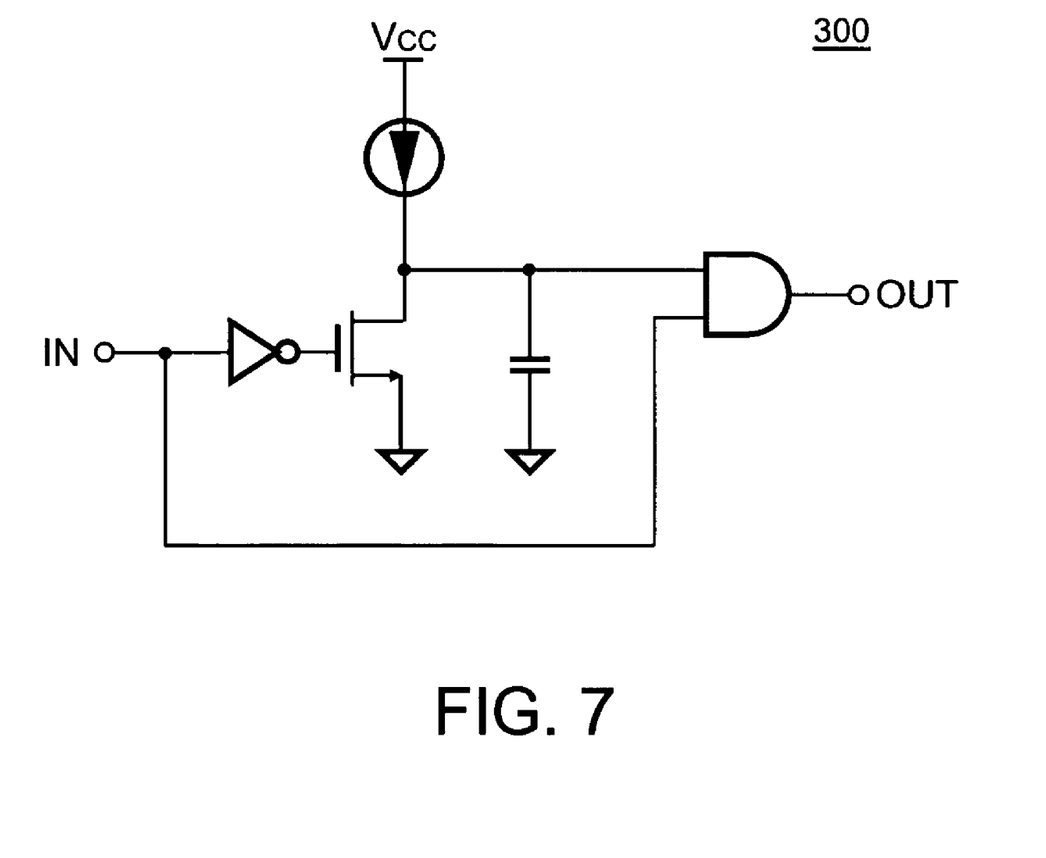
FIG. 7 is a schematic diagram of a time delay circuit, according to an embodiment of the present invention.

FIG. 5 is a schematic circuit of the control circuit 100 according to an embodiment of the present invention. The control circuit 100 includes an oscillation circuit 200 for generating a pulse signal PLS, a saw-tooth signal RMP, and a maximum-duty signal MD. The pulse signal PLS is supplied to a clock input of a flip-flop 85 via an inverter 71. A comparator 80 resets the flip-flop 85. Two inputs of the comparator 80 are coupled to the feedback terminal FB and the output of a circuit 350, respectively. The circuit 350 generates a slope signal by adding up the saw-tooth signal RMP and the switching current signal $V_S$. The flip-flop 85 is reset once the slope signal is higher than the feedback signal $V_{FB}$. An output of the flip-flop 85 is connected to a third input of an AND gate 91 for generating the first signal $S_1$. A second input and a fourth input of the AND gate 91 are coupled to an output of the inverter 71 and the maximum-duty signal MD, respectively. A flip-flop 86 having a clock input is coupled to the first signal $S_1$ via a delay circuit 300 and an inverter 72. FIG. 7 shows a schematic circuit of the delay circuit 300. The delay circuit 300 determines the first delay time $T_{D1}$. Therefore, the flip-flip 86 is turned on at the falling edge of the first signal $S_1$ after the first delay time $T_{D1}$. The output of the inverter 71 is used to reset the flip-flop 86. The flip-flop 86 is reset as the pulse signal PLS is enabled. An output of the flip-flop 86 is connected to a first input of an AND gate 92 for generating the second signal $S_2$. A second input of the AND gate 92 is connected to the output of the inverter 71. Furthermore, an output of the AND gate 92 is connected to a first input of the AND gate 91 via an inverter 76. An output of the AND gate 91 is connected to a third input of the AND gate 92 via an inverter 75 to form an exclusive circuit for preventing across conduction of the first switch 10 and the second switch 20. Because the first signal $S_1$ and the second signal $S_2$ are disabled as the pulse signal PLS is enabled, an increment of the pulse width of the pulse signal PLS shall respectively increase the off-time of the first signal $S_1$ and the second signal $S_2$. Off-time is defined as the time period during a signal being turned off. For the first range of the feedback signal $V_{FB}$, the resistor 56 determines the pulse width of the pulse signal PLS via the input terminal RD. For the second range of the feedback signal $V_{FB}$, the pulse width of the pulse signal PLS is increased corresponding to the decrement of the feedback signal $V_{FB}$. Therefore, the switching frequency of the first signal $S_1$ and the switching frequency of the second signal $S_2$ are decreased to reduce the switching losses as the output load decreases.

Figure 6:
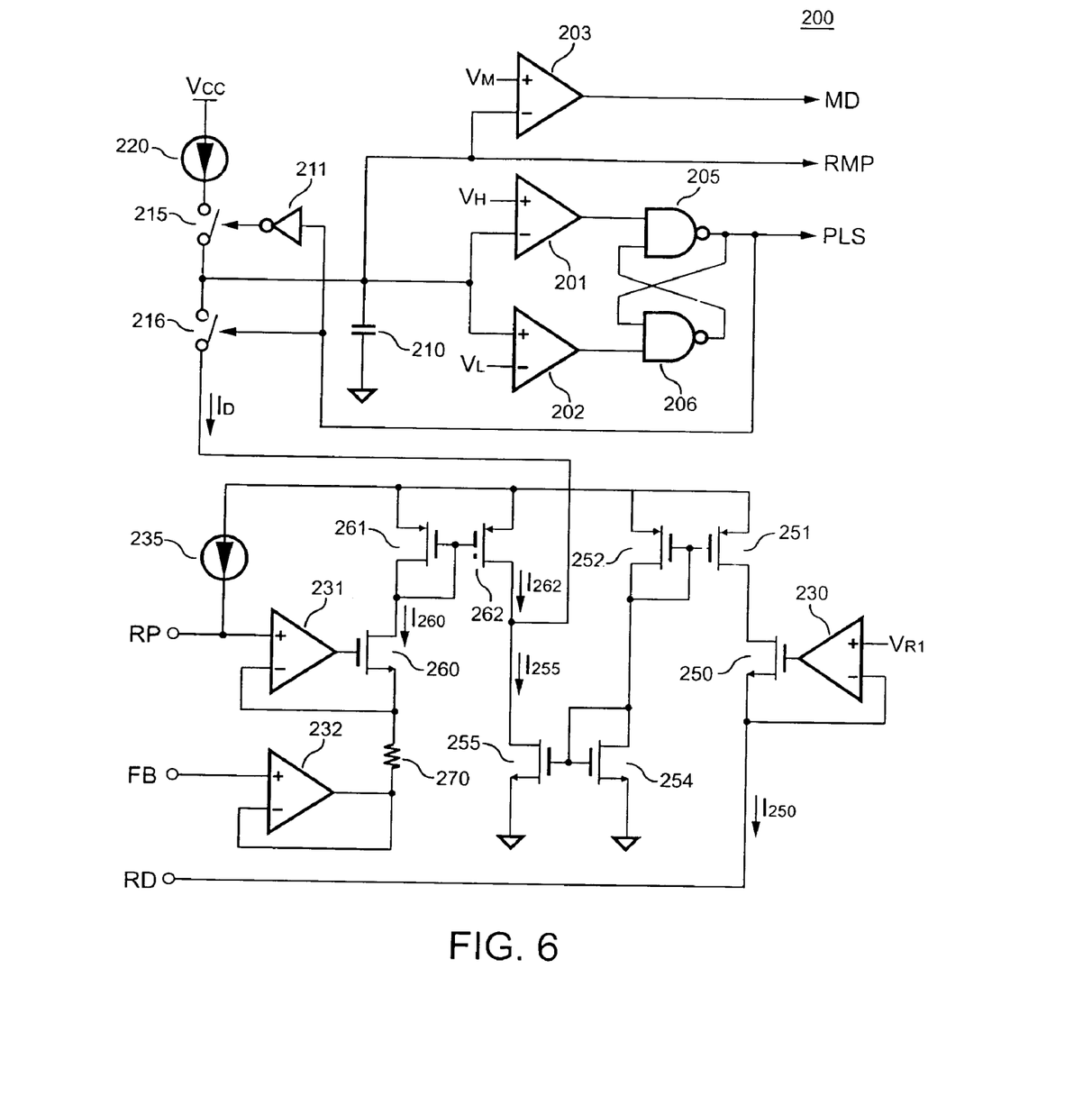
FIG. 6 is a schematic circuit of an oscillation circuit according to an embodiment of the present invention.

FIG. 6 illustrates the oscillation circuit 200 according to an embodiment of the present invention. Comparators 201 and 202 have a trip-point voltage $V_H$ and a trip-point voltage $V_L$, respectively. A negative input of the comparator 201 and a positive input of the comparator 202 are connected to a capacitor 210. A current source 220 charges the capacitor 210 via a switch 215. A switch 216 is applied to discharge the capacitor 210. NAND gates 205 and 206 form a latch circuit, which generates the pulse signal PLS. The pulse signal PLS is enabled and disabled by the outputs of the comparators 201 and 202, respectively. The pulse signal PLS enables the switch 216 for discharging the capacitor 210 once the voltage of the capacitor 210 is higher than the trip-point voltage $V_H$. Via an inverter 211, the pulse signal PLS is applied to enable the switch 215 for charging the capacitor 210 once the voltage of the capacitor 210 is lower than the trip-point voltage $V_L$. The saw-tooth signal RMP is therefore generated across the capacitor 210. A comparator 203 includes a reference voltage $V_M$. A negative input of the comparator 203 is connected to the capacitor 210. An output of the comparator 203 generates the maximum-duty signal MD for determining a maximum duty cycle of the first signal $S_1$. An operational amplifier 230 has a positive input supplied with a reference voltage $V_{R1}$ and a negative input connected to the input terminal RD. The operational amplifier 230 associates with a transistor 250 and the resistor 56 (as shown in FIG. 3) to generate a current $I_{250}$. Transistors 251 and 252 develop a first current mirror. Transistors 254 and 255 develop a second current mirror. A current $I_{255}$ flowing via the transistor 255 is mirrored from the current $I_{250}$ via the first current mirror and the second current mirror. The current $I_{255}$ further discharges the capacitor 210 via the switch 216.

A current source 235 connected to the programming input RP associates with the resistor 57 (as shown in FIG. 3) to generate a voltage to determine the threshold. The programming input RP is connected to an operational amplifier 231. The feedback terminal FB is connected to an operational amplifier 232. The operational amplifiers 231, 232, a resistor 270 and a transistor 260 form a voltage-to-current converter to generate a current $I_{260}$. The current $I_{260}$ can be expressed as follows:

$$I_{260}=(V_{TH}-V_{FB})/R_{270}$$

where $V_{TH}$ is the voltage of the threshold; $V_{Th}=I_{235} \times R_{57}$.

The current $I_{260}$ is produced when the $V_{FB}$ is lower than the $V_{TH}$. Transistors 261, 262 form a third current mirror to generate a current $I_{262}$ in response to the current $I_{260}$. The current $I_{262}$ is further coupled to the transistor 255 to determine the discharge current $I_D$ for the capacitor 210. The discharge current $I_D$ is given as follows:

$$I_D=I_{255}-I_{262}$$

$$I_D=[k_1 \times (V_{R1}/R_{56})]-\{k_3 \times [(I_{235} \times R_{57})-V_{FB}]/R_{270}\}$$

where $k_1$ and $k_3$ are the ratios of the first current mirror and the third current mirror, respectively; $R_{56}$, $R_{57}$, $R_{270}$ are the resistance of the resistors 56, 57 and 270, respectively. Therefore, the resistor 56 determines the current $I_{255}$ and the discharge current $I_D$ of the capacitor 210 for the first range of the feedback signal $V_{FB}$. The resistor 57 determines the threshold to decide the first range and the second range of the feedback signal $V_{FB}$. The feedback signal $V_{FB}$ is decreased in response to the decrement of the output load. Therefore, the discharge current $I_D$ for the capacitor 210 decreases and the second delay time $T_{D2}$ increases proportionally to the decrement of the output load for the second range of the feedback signal $V_{FB}$.

Since the switching frequency of the first switch 10 and the switching frequency of the second switch 20 decrease in response to the decrement of the output load, the power consumption of the power converter is reduced under light load conditions. Besides, only the second delay time $T_{D2}$ is varied. The timing of the first signal $S_1$ and the second signal $S_2$ are kept the same under both light load and heavy load conditions, which ensures a proper operation for the soft switching power converter.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A soft switching power converter, comprising:
   a transformer;
   a capacitor, coupled to said transformer for soft switching operation;
   a first switch, coupled for switching said transformer to transfer energy from an input of said power converter to an output of said power converter;
   a second switch, coupled for switching energy in said capacitor to said transformer; and
   a control circuit, coupled to said output of said power converter for generating a first signal and a second signal in response to a feedback signal for regulating an output of said power converter, wherein said first signal and said second signal are coupled for switching said first switch and said second switch, respectively;
   wherein an on-time of said second signal increases in response to a decrement of said on-time of said first signal in a first range of said feedback signal, a first delay time is generated after said first switch is turned off and before said second signal is enabled, a second delay time is generated after said second switch is turned off and before said first signal is enabled, wherein said second delay time is constant corresponding to said first range of said feedback signal, said second delay time is varied with respect to a second range of said feedback signal, and said second delay time is increased proportionally to a decrement of said feedback signal.

2. The soft switching power convener as claimed in claim 1, wherein said control circuit further comprises an input terminal for programming said second delay time in said first range of said feedback signal.

3. The soft switching power converter as claimed in claim 2, wherein a resistor is connected from said input terminal of said control circuit to a ground reference for programming said second delay time.

4. The soft switching power converter as claimed in claim 1, wherein said control circuit further comprises a threshold to define said first range of said feedback signal or said second range of said feedback signal.

5. The soft switching power converter as claimed in claim 4, wherein said control circuit further comprises a programming terminal for programming said threshold.

6. The soft switching power converter as claimed in claim 5, wherein a resistor is connected from said programming terminal of said control circuit to a ground reference for programming said threshold.

7. A soft switching power supply, comprising:
- a transformer;
- a capacitor, coupled to said transformer for soft switching operation;
- a first switch, coupled for switching said transformer to transfer energy from an input of said power supply to an output of said power supply;
- a second switch, coupled to switch energy of said capacitor to said transformer; and
- a controller, coupled to said output of said power supply to generate a first signal and a second signal in response to a feedback signal for regulating said output of said power supply, wherein said first signal and said second signal switch said first switch and said second switch, respectively;
- wherein a first delay time is generated after said first switch is turned off and before said second signal is enabled, a second delay time is generated after said second switch is turned off and before said first signal is enabled, wherein said controller further comprises an input terminal for programing said second delay time in a first range of said feedback signal, wherein a resistor is connected from said input terminal of said controller to a around reference for programming said second delay time, said second delay time being varied corresponding to a second range of the feedback signal, wherein said second delay time is increased proportionally to a decrement of said feedback signal.

8. The soft switching power supply as claimed in claim 7, wherein said controller further comprises a threshold for defining said first range of said feedback signal or said second range of said feedback signal.

9. The soft switching power converter as claimed in claim 8, wherein said controller further comprises a programming terminal for programming said threshold.

10. A soft switching regulator, comprising:
- a magnetic device;
- a capacitor, coupled to said magnetic device for soft switching operation;
- a first switch, coupled for switching said magnetic device to transfer energy from an input of said regulator to an output of said regulator;
- a second switch, coupled to switch energy of said capacitor to said magnetic device; and
- a circuit, coupled to said output of said regulator for generating a first signal and a second signal for switching said first switch and said second switch, respectively, wherein said first signal includes a duty cycle for regulating said output of said regulator;
- wherein a first delay time is generated after said first switch is turned off and before said second signal is enabled, a second delay time is generated after said second switch is turned off and before said first signal is enabled, wherein said circuit further comprises an input terminal for programming said second delay time in a first range of said duty cycle, said second delay time being varied with respect to a second range of said duty cycle, wherein said second delay time is increased proportionally to the decrement of said duty cycle, wherein said circuit further comprises a threshold for defining said first range of said duty cycle or said second range of said duty cycle, said circuit further comprising a programming terminal for programming said threshold.

* * * * *